(12) United States Patent
Ito et al.

(10) Patent No.: US 12,715,304 B2
(45) Date of Patent: Aug. 25, 2026

(54) ELECTRIC VEHICLE

(71) Applicant: TOYOTA JIDOSHA KABUSHIKI KAISHA, Toyota (JP)

(72) Inventors: Sho Ito, Toyota (JP); Kazuaki Ishiura, Okazaki (JP); Takashi Katayama, Toyota (JP); Yoshihiro Morita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 18/442,257

(22) Filed: Feb. 15, 2024

(65) Prior Publication Data

US 2024/0278649 A1 Aug. 22, 2024

(30) Foreign Application Priority Data

Feb. 20, 2023 (JP) ................................ 2023-024688

(51) Int. Cl.
*B60L 15/00* (2006.01)
*B60K 1/04* (2019.01)
*B60L 53/16* (2019.01)

(52) U.S. Cl.
CPC .............. *B60L 15/007* (2013.01); *B60K 1/04* (2013.01); *B60L 53/16* (2019.02); *B60K 2001/0422* (2013.01)

(58) Field of Classification Search
CPC ......... B60L 15/007; B60L 53/16; B60K 1/04; B60K 2001/0422
See application file for complete search history.

(56) References Cited

U.S. PATENT DOCUMENTS 6,220,380 B1 4/2001 Mita et al.
9,121,722 B1 * 9/2015 Yu ...................... G01C 21/3469
9,145,058 B2 * 9/2015 Suzuki ..................... B60K 1/00
10,160,325 B2 * 12/2018 Lee ....................... B60L 3/0046
11,139,522 B1 * 10/2021 Styles ................ H01M 50/502
12,515,512 B2 * 1/2026 Miyamoto .............. B60K 6/40
(Continued)

FOREIGN PATENT DOCUMENTS

JP H11-180163 A 7/1999
JP 2003-125516 A 4/2003
(Continued)

*Primary Examiner* — Jacob B Meyer
(74) *Attorney, Agent, or Firm* — Sughrue Mion, PLLC

(57) ABSTRACT

An electric vehicle includes: an electric motor; a power transmission device; a driving battery to be connected to an external charger; an electric-power control device for controlling an electric power transferred between the battery and the electric motor; a connector connecting between the electric-power control device and an electrical wire connected to the battery; a relay box for switching power supply paths to the battery; and a power source compartment which houses a drive apparatus including the electric motor and the power transmission device and which is provided on a front or rear side of a driver's seat compartment in a longitudinal direction of the electric vehicle. The electric-power control device, connector and relay box are disposed in the power source compartment. The connector is located adjacent to the relay box and is located between the relay box and the driver's seat compartment in the longitudinal direction.

5 Claims, 5 Drawing Sheets

(56) References Cited

U.S. PATENT DOCUMENTS

| | | | | |
|---|---|---|---|---|
| 2012/0087064 | A1* | 4/2012 | Kwon | B60L 3/0069 361/643 |
| 2017/0005371 | A1* | 1/2017 | Chidester | H01M 50/20 |
| 2019/0176729 | A1* | 6/2019 | Link | B60L 58/22 |
| 2020/0207222 | A1 | 7/2020 | Kanzaki | |
| 2021/0323417 | A1* | 10/2021 | Kwon | B60L 50/64 |
| 2024/0097380 | A1* | 3/2024 | Uneme | H01R 13/512 |
| 2024/0278649 | A1* | 8/2024 | Ito | B60R 16/04 |

FOREIGN PATENT DOCUMENTS

| | | | | |
|---|---|---|---|---|
| JP | 2020-108217 | A | 7/2020 | |
| KR | 10-2021-0129534 | A | 10/2021 | |
| WO | 2013/073491 | A1 | 5/2013 | |
| WO | WO-2013183500 | A1 * | 12/2013 | B60L 3/04 |

* cited by examiner

ELECTRIC VEHICLE

This application claims priority from Japanese Patent Application No. 2023-024688 filed on Feb. 20, 2023, the disclosure of which is herein incorporated by reference in its entirety.

FIELD OF THE INVENTION

The present invention relates to an electric vehicle including a battery that is to be connected to an external charger so as to charged.

BACKGROUND OF THE INVENTION

There is well-known a relay box installed in a vehicle. A vehicle relay box disclosed in JP 2003-125516A is an example of such a relay box. The relay box disclosed in the Japanese Patent Application Publication is provided with a detachable relay cassette, so as to be used commonly for various types of vehicles.

SUMMARY OF THE INVENTION

By the way, there is also well-known an electric vehicle that is provided with: a drive apparatus including an electric motor and a power transmission device: a battery; and an electric-power control device configured to control an electric power transferred between the battery and the electric motor, wherein the battery is to be connected to an external charger so as to be charged. In such an electric vehicle, it might be possible to dispose the electric-power control device, the relay box and a connector in a power source compartment that houses the drive apparatus, wherein the connector connects between the electric-power control device and an electrical wire that is connected to the battery. However, in this arrangement, depending on a position in which the connector is located, there is a risk that the connector could be affected in event of collision of the electric vehicle.

The present invention was made in view of the background art described above. It is therefore an object of the present invention to provide an electric vehicle that is capable of avoiding or suppressing damage of a connector in event of collision of the electric vehicle.

The object indicated above is achieved according to the following aspects of the present invention.

According to a first aspect of the invention, there is provided an electric vehicle including: (a) a drive wheel; (b) an electric motor serving as a power source; (c) a power transmission device configured to transmit a power of the electric motor to the drive wheel; (d) a driving battery that is to be connected to an external charger so as to be charged; (e) an electric-power control device configured to control an electric power transferred between the battery and the electric motor; (f) a connector connecting between the electric-power control device and an electrical wire that is connected to the battery; (g) a relay box configured to switch power supply paths to the battery in accordance with the electric power of the external charger; and (h) a power source compartment which houses a drive apparatus including the electric motor and the power transmission device and which is provided on one of opposite sides of a driver's seat compartment in a longitudinal direction of the electric vehicle. The electric-power control device, the connector and the relay box are disposed in the power source compartment. The connector is located adjacent to the relay box and is located between the relay box and the driver's seat compartment in the longitudinal direction.

In the electric vehicle according to the first aspect of the invention, the electric-power control device, the connector connecting between the electric-power control device and the electrical wire that is connected to the battery and the relay box configured to switch the power supply paths to the battery are disposed in the power source compartment that is provided on a front or rear side as the above-described one of the opposite sides of the driver's seat compartment in the longitudinal direction. Further, the connector is located adjacent to the relay box and is located between the relay box and the driver's seat compartment in the longitudinal direction. In event of collision of the electric vehicle, this arrangement makes it easier to protect the connector from interference by a member or members located on a collision side of the connector, so that it is possible to avoid or suppress damage of the connector due to the collision.

DETAILED DESCRIPTION OF PREFERRED EMBODIMENT

Hereinafter, there will be described preferred embodiment in detail with reference to the accompanying drawings.

Embodiment

Figure 1:
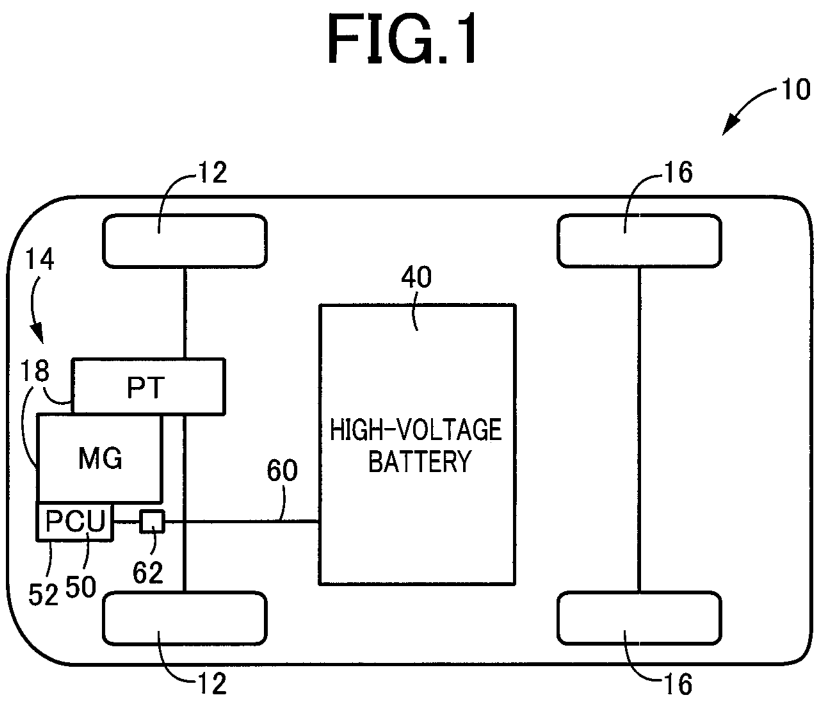
FIG. 1 is a view schematically showing a construction of an electric vehicle to which the present invention is applied.
Figure 2:
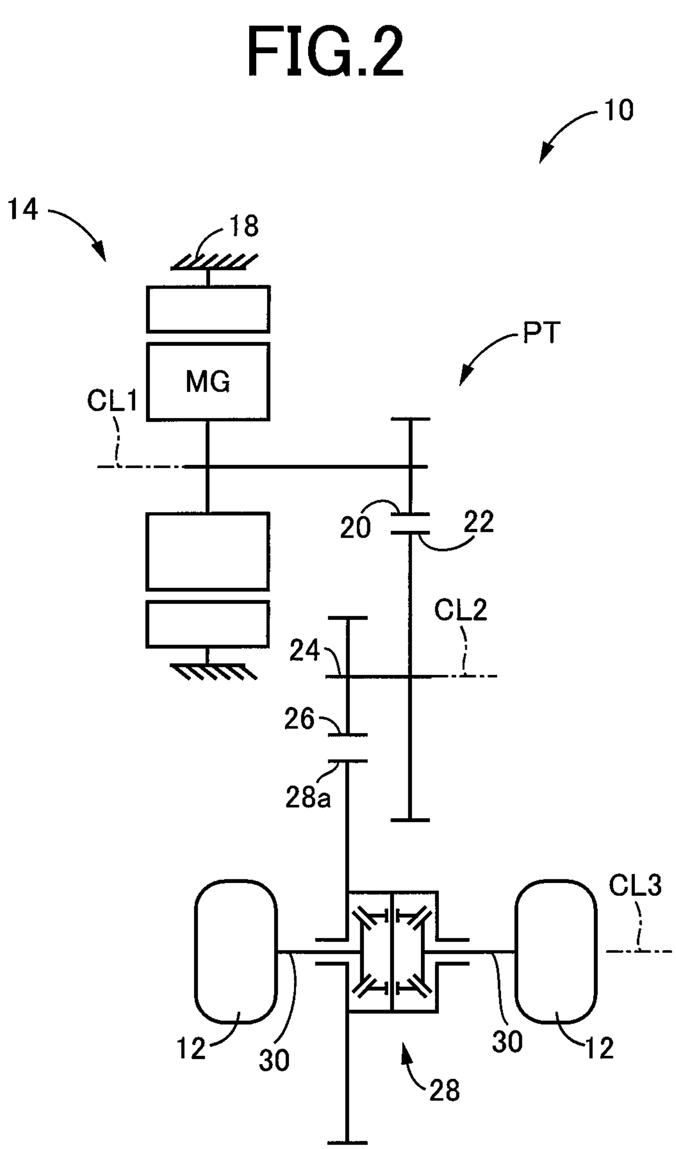
FIG. 2 is a view schematically showing, by way of example, a construction of a drive system in the electric vehicle.

FIG. 1 is a view schematically showing a construction of an electric vehicle 10 to which the present invention is applied. FIG. 2 is a view schematically showing, by way of example, a construction of a drive system in the electric vehicle 10 (hereinafter simply referred to as "vehicle 10"). As shown in FIGS. 1 and 2, the vehicle 10 includes drive wheels in the form of right and left front wheels 12, driven wheels in the form of right and left rear wheels 16 and a drive apparatus 14 configured to drive the front wheels 12. The vehicle 10 further includes a high-voltage battery 40 and an electric-power control unit 50. The drive apparatus 14 includes an electric motor MG functioning as a power source and a power transmission device PT configured to transmit a power from the electric motor MG to the front wheels 12. The vehicle 10 is an electric vehicle in which the high-voltage battery 40 is to be charged with the vehicle 10 being connected to a charging station 100 (see FIG. 5). The charging station 100 is constituted by an external charger (such as a quick charger) that is provided in a parking lot or the like for charging the high-voltage battery 40 with DC power.

The electric motor MG is a so-called "motor generator" that is a known rotary electric machine having a function serving as a motor configured to generate a mechanical power from an electric power and a function serving as a generator configured to generate the electric power from the mechanical power. The electric motor is disposed within a case 18 as a non-rotary member that is unrotatably attached to a body of the vehicle 10.

The power transmission device PT includes a drive gear 20, a driven gear 22, a driven shaft 24, a final gear 26 and a differential gear device 28 that are disposed within the case 18. The electric motor MG includes a rotor shaft connected to the drive gear 20, so as to be connected to the drive gear 20 in a power transmittable manner. The drive gear 20 is an output rotary member of the electric motor MG. The driven gear 22 is larger in diameter than the drive gear 20, and meshes with the drive gear 20. The driven gear 22 and the final gear 26 are fixed on the driven shaft 24, so as to be unrotatable relative to each other. The final gear 26 is smaller in diameter than the driven gear 22, and meshes with a differential ring gear 28*a* of the differential gear device 28. The power transmission device PT further includes a pair of drive shafts 30 connected to the differential gear device 28. The power transmission device PT is configured to transmit the power outputted from the electric motor MG, to the driven gear 22 through the drive gear 20, and is configured to transmit the power (transmitted to the driven gear 22) to the front wheels 12 sequentially through the driven shaft 24, final gear 26, differential gear device 28 and drive shafts 30, for example.

The power transmission device PT has three axes, i.e., a first axis CL1, a second axis CL2 and a third axis CL3, which are parallel to one another. The first axis CL1 corresponds to an axis of the rotor shaft of the electric motor MG. The electric motor MG and the drive gear 20 are arranged around the first axis CL1. That is, the first axis CL1 is an axis about which the electric motor MG is to be rotated. The second axis CL2 corresponds to an axis of the driven shaft 24. The driven gear 22 and the final gear 26 are arranged around the second axis CL2. That is, the second axis CL2 is an axis about which the driven gear 22, the driven shaft 24 and the final gear 26 are to be rotated. The third axis CL3 corresponds to axes of the drive shafts 30 and an axis of the differential gear device 28. The differential gear device 28 is arranged around the third axis CL3. That is, the third axis CL3 is an axis about which the drive shafts 30 and differential gear device 28 are to be rotated.

The high-voltage battery 40 is a DC power source that is chargeable and dischargeable, and is a secondary battery constituted by a nickel-hydrogen battery or a lithium-ion battery, for example. The high-voltage battery 40 is connected to the electric-power control unit 50. The stored electric power is supplied from the high-voltage battery 40 to, for example, the electric motor MG through the electric-power control unit 50. In addition, the high-voltage battery 40 is supplied with the electric power regenerated by a regeneration control of the electric motor MG through the electric-power control unit 50. The high-voltage battery 40 corresponds to "driving battery" recited in the appended claims.

The electric-power control unit 50 includes an inverter (not shown) that constitutes a three-phase bridge circuit of U phase, V phase and W phase using switching elements such as transistors. The electric-power control unit 50 converts the DC power from the high-voltage battery 40 into AC power, and supplies the AC power to the electric motor MG. The electric-power control unit 50 converts the AC power generated by the electric motor MG through a regenerative brake, into the DC power, and supplies the DC power to the high-voltage battery 40. The electric-power control unit 50 is an electric-power control device, i.e., a PCU (Power Control Unit) that controls the electric power transferred between the high-voltage battery 40 and the electric motor MG.

The high-voltage battery 40 and the electric-power control unit 50 are electrically connected to each other through electrical wires and connectors. The vehicle 10 further includes high-voltage cables 60 and a battery connector 62. The high-voltage cables 60 are electrical wires connected to the high-voltage battery 40. The battery connector 62 connects between the high-voltage cables 60 and the electric-power control unit 50.

By the way, in a case in which a PCU case 52 housing the electric-power control unit 50 is located adjacent to the case 18 in the vehicle 10, there is a risk that the battery connector 62 could be damaged if the battery connector 62 is attached to the PCU case 52. For example, in a case in which the battery connector 62 is attached to a front end as one of opposite ends of the PCU case 52 in a longitudinal direction of the vehicle 10, the battery connector 62 is likely to interfere with a front member or members of the vehicle 10 in event of frontal collision of the vehicle 10. Further, in a case in which the battery connector 62 is attached to a right or left end as one of opposite ends of the PCU case 52 in a width direction of the vehicle 10, the battery connector 62 is likely to interfere with a side member or members of the vehicle 10 in event of collision of the vehicle 10. Further, in a case in which the battery connector 62 is attached to a rear end as one of opposite ends of the PCU case 52 in the longitudinal direction of the vehicle 10, the battery connector 62 is likely to interfere with the drive shafts 30 in event of collision of the vehicle 10. Since the battery connector 62 is a high-voltage part, it is desirable to avoid or suppress damage of the battery connector 62 in event of collision of the vehicle 10.

Figure 3A:
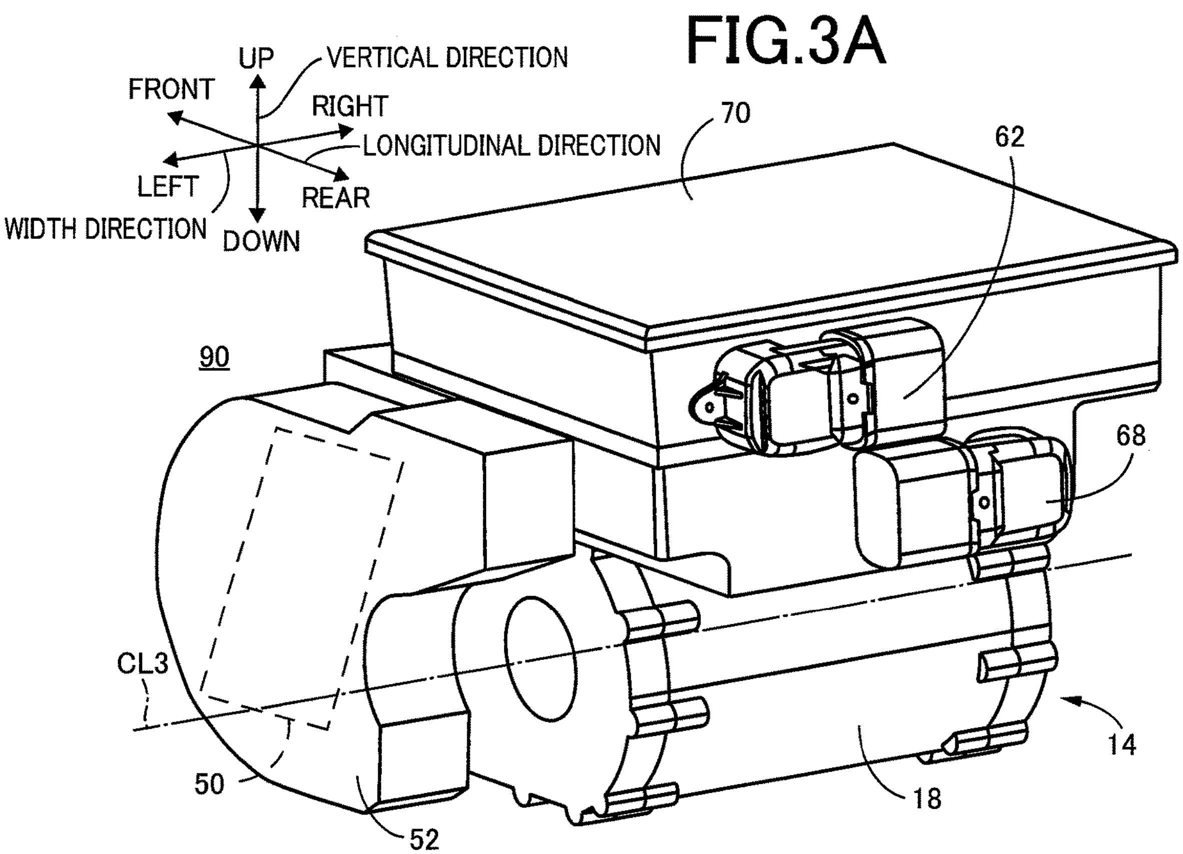
FIGS. 3A and 3B are views showing, by way of example, an installed position of a battery connector, for avoiding or suppressing damage of the battery connector in event of collision of the electric vehicle.
Figure 3B:
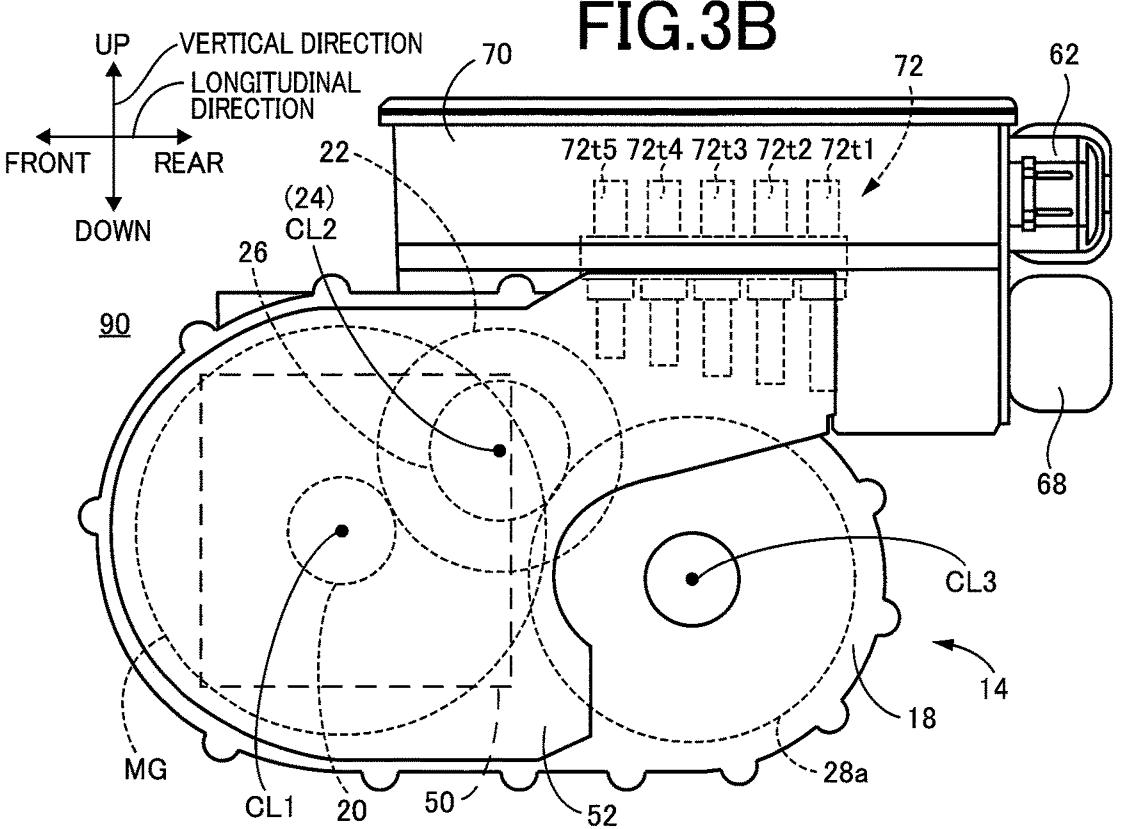
Figure 4:
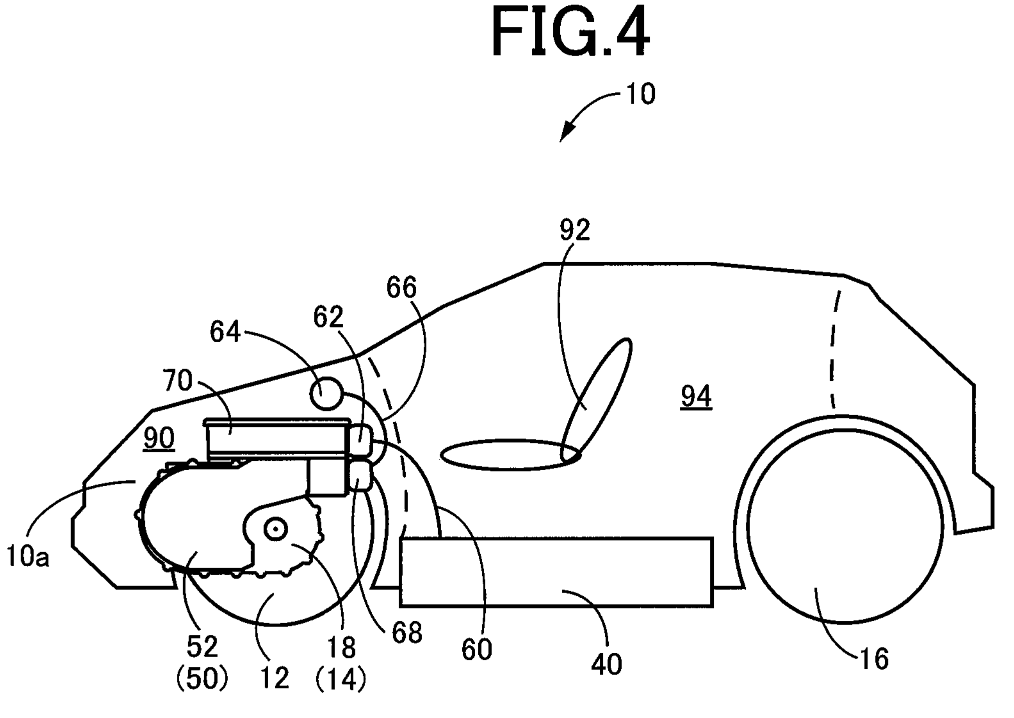
FIG. 4 is a view showing, by way of example, a state in which an electric-power control unit and other components are installed in the electric vehicle.
Figure 5:
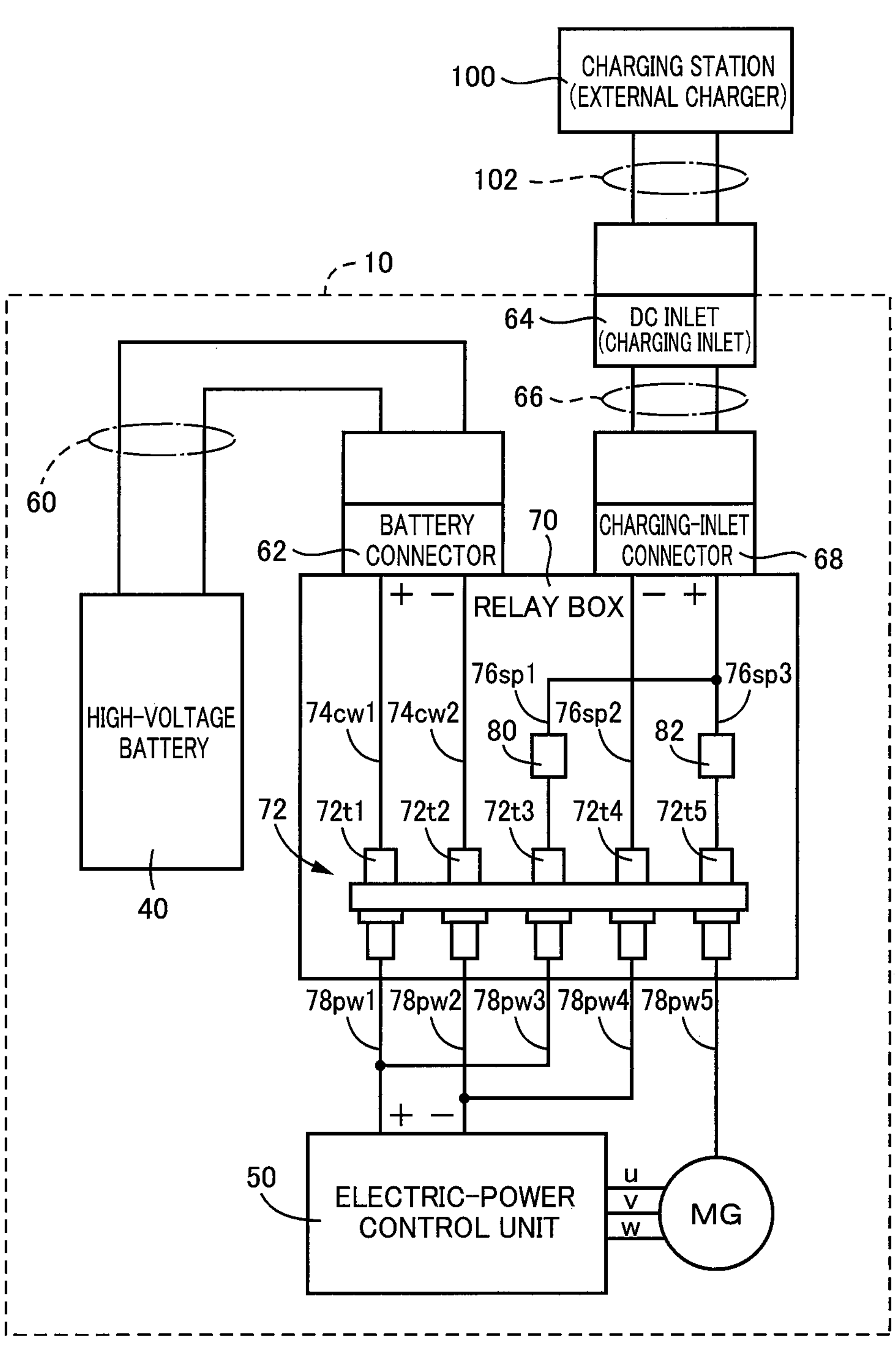
FIG. 5 is a view showing, by way of example, transfer of an electric power to and from a high-voltage battery.

FIGS. 3A and 3B are views showing, by way of example, an installed position of the battery connector 62, for avoiding or suppressing damage of the battery connector 62 in event of a collision of the vehicle 10. FIG. 4 is a view showing, by way of example, a state in which the drive apparatus 14, the electric-power control unit 50 and other components are installed in the vehicle 10. FIG. 5 is a view showing, by way of example, transfer of the electric power to and from the high-voltage battery 40. FIG. 3A is a perspective view as seen from a rear left side of the vehicle 10. FIG. 3B is a side view as seen from a left side of the vehicle 10 in the width direction. FIG. 4 is an external view of the vehicle 10 as seen from the left side in the width direction. It is noted that "VERTICAL DIRECTION", "LONGITUDINAL DIRECTION" and "WIDTH DIRECTION" in FIGS. 3A, 3B and 4 indicate the vertical direction, the longitudinal direction and the width direction of the vehicle 10, respectively, and that the first, second and third axes CL1, CL2, CL3 are all parallel to the width direction.

As shown in FIGS. 3A, 3B, 4 and 5, the vehicle 10 further includes a relay box 70 that has a function of switching the power supply paths PS to the high-voltage battery 40 in accordance with the electric power of the charging station 100. The electric-power control unit 50 (i.e., the PCU case 52), the battery connector 62 and the relay box 70 are disposed in a front compartment 90. The front compartment 90 is a power source compartment that houses the drive apparatus 14, i.e., the case 18, namely, is a power source compartment that houses the power source. The front compartment 90 is located on a front side as one of opposite sides of a driver's seat compartment 94 in the longitudinal direction of the vehicle 10, wherein a driver's seat 92 is provided in the driver's seat compartment 94. The high-voltage battery 40 is located on a lower side of the driver's seat compartment 94 in the vertical direction.

When being installed in the vehicle 10, the battery connector 62 is located adjacent to the relay box 70 on one of opposite sides of the relay box 70, which is close to the driver's seat compartment 94, in the longitudinal direction of the vehicle 10, namely, is located between the relay box 70 and the driver's seat compartment 94 in the longitudinal direction. That is, when being installed in the vehicle 10, the battery connector 62 is located adjacent to the relay box 70 on a rear side as the above-described one of the opposite sides of the relay box 70 in the longitudinal direction.

The vehicle 10 further includes a DC inlet 64, in-vehicle charging cables 66 and a charging-inlet connector 68. The DC inlet 64 is provided in an outer plate 10*a* that defines the front compartment 90, namely, provided in a side surface of the body of the vehicle 10. The DC inlet 64 is a charging inlet that is to be connected to the charging station 100 through external charging cables 102 provided in the charging station 100. The DC inlet 64 is a terminal to which the external charging cables 102 are to be connected for inputting the DC power supplied from the charging station 100. The in-vehicle charging cables 66 are electrical wires connected to the DC inlet 64. The charging-inlet connector 68 is a second connector connecting between the in-vehicle charging cables 66 and the relay box 70. The charging-inlet connector 68 is located in the front compartment 90. When being installed in the vehicle 10, the charging-inlet connector 68 as well as the battery connector 62 as a first connector is located on one of opposite sides of the relay box 70, which is close to the driver's seat compartment 94, in the longitudinal direction of the vehicle 10, namely, is located between the relay box 70 and the driver's seat compartment 94 in the longitudinal direction. That is, when being installed in the vehicle 10, the charging-inlet connector 68 as well as the battery connector 62 is located adjacent to the relay box 70 on a rear side as the above-described one of the opposite sides of the relay box 70 in the longitudinal direction. Thus, both of the charging-inlet connector 68 and the battery connector 62 are located to be arranged on the same side of the relay box 70, namely, both of the charging-inlet connector 68 and the battery connector 62 are arranged side by side on one of the opposite sides of the relay box 70 in the longitudinal direction. The battery connector 62 is located on an upper side of the charging-inlet connector 68 in the vertical direction.

The electric-power control unit 50 (i.e., the PCU case 52) and the relay box 70 are located adjacent to the drive apparatus 14 (i.e., the case 18). When being installed in the vehicle 10, the PCU case 52 is located adjacent to the case 18 on a left side as one of opposite sides of the case 18 in the width direction of the vehicle 10. When being installed in the vehicle 10, the relay box 70 is located adjacent to the case 18 on an upper side of the case 18 in the vertical direction.

The vehicle 10 includes a terminal block 72 that is located between the electric-power control unit 50 and the relay box 70. The terminal block 72 is provided within the relay box 70, for example. The terminal block 72 includes a first terminal 72*t*1, a second terminal 72*t*2, a third terminal 72*t*3, a fourth terminal 72*t*4 and a fifth terminal 72*t*5.

The vehicle 10 includes a first connector wire 74*cw*1, a second connector wire 74*cw*2, a first supply path 76*sp*1, a second supply path 76*sp*2, a third supply path 76*sp*3, a first power wire 78*pw*1, a second power wire 78*pw*2, a third power wire 78*pw*3, a fourth power wire 78*pw*4, a fifth power wire 78*pw*5, a first relay 80 and a second relay 82.

The first connector wire 74*cw*1 is connected to the battery connector 62, and connects between the first terminal 72*t*1 and a positive terminal of the battery connector 62 within the relay box 70. The second connector wire 74*cw*2 is connected to the battery connector 62, and connects between the second terminal 72*t*2 and a negative terminal of the battery connector 62 within the relay box 70.

The first supply path 76*sp*1 is one of the power supply paths PS which is to be selectively connected and disconnected in accordance with the electric power of the charging station 100, so as to connect between the third terminal 72*t*3 and a positive terminal of the charging-inlet connector 68 through the first relay 80 within the relay box 70. The first relay 80 is a normally open relay that is to be closed when a voltage of the charging station 100 is substantially equal to a voltage of the high-voltage battery 40 during charge by the charging station 100.

The second supply path 76*sp*2 is one of the power supply paths PS which is connected irrespective of the electric power of the charging station 100, and which connects between the fourth terminal 72*t*4 and a negative terminal of the charging-inlet connector 68 within the relay box 70.

The third supply path 76*sp*3 is one of the power supply paths PS which is to be selectively connected and disconnected in accordance with the electric power of the charging station 100, so as to connect between the fifth terminal 72*t*5 and the positive terminal of the charging-inlet connector 68 through the second relay 82 within the relay box 70. The second relay 82 is a normally open relay that is to be closed when the voltage of the charging station 100 is different from the voltage of the high-voltage battery 40 during charge by the charging station 100.

The first power wire 78*pw*1 is connected to the electric-power control unit 50, and connects between the first terminal 72*t*1 and a positive terminal of the electric-power control unit 50. The second power wire 78*pw*2 is connected to the electric-power control unit 50, and connects between the second terminal 72*t*2 and a negative terminal of the electric-power control unit 50. The third power wire 78*pw*3 is connected to the electric-power control unit 50 and the first power wire 78*pw*1, and connects between the third terminal 72*t*3 and each of the positive terminal of the electric-power control unit 50 and the first terminal 72*t*1. The fourth power wire 78*pw*4 is connected to the electric-power control unit 50 and the second power wire 78*pw*2, and connects between the fourth terminal 72*t*4 and each of the negative terminal of the electric-power control unit 50 and the second termina 72*t*2. The fifth power wire 78*pw*5 is connected to the first power wire 78*pw*1 sequentially through the electric motor MG and the electric-power control unit 50, and connects between the electric motor MG and the fifth terminal 72*t*5.

The first terminal 72*t*1 connects between the first connector wire 74*cw*1 and the first power wire 78*pw*1. The second terminal 72*t*2 connects between the second connector wire 74*cw*2 and the second power wire 78*pw*2. The third terminal 72*t*3 connects between the first supply path 76*sp*1 and the third power wire 78*pw*3. The fourth terminal 72*t*4 connects between the second supply path 76*sp*2 and the fourth power wire 78*pw*4. The fifth terminal 72*t*5 connects between the third supply path 76*sp*3 and the fifth power wire 78*pw*5.

As described above, in the present embodiment, the electric-power control unit 50, the battery connector 62 and the relay box 70 are disposed in the front compartment 90. Further, when being installed in the vehicle 10, the battery connector 62 is located adjacent to a rear end of the relay box 70 and is located between the relay box 70 and the driver's seat compartment 94 in the longitudinal direction. In event of frontal collision of the vehicle 10, this arrangement makes it easier to protect the battery connector 62 from interference by a member or members (such as a radiator and a member supporting the radiator) located on the frontal collision side of the battery connector 62, so that it is possible to avoid or suppress damage of the battery connector 62 due to the collision.

In the present embodiment, the terminal block 72 including five terminals in the form of the first, second, third, fourth and fifth terminals 72*t*1, 72*t*2, 72*t*3, 72*t*4, 72*t*5 are located between the electric-power control unit 50 and the relay box 70. That is, the terminal block 72, which is provided with the third, fourth and fifth terminal 72*t*3, 72*t*4, 72*t*5 connected to the charging-inlet connector 68, is provided with the first and second terminals 72*t*1, 72*t*2 connected to the battery connector 62. This arrangement eliminates need for a part exclusive for provision of the battery connector 62, and allows the battery connector 62 to be provided without increasing size of a unit such as the electric-power control unit 50.

In the present embodiment, the high-voltage battery 40 is located on the lower side of the driver's seat compartment 94 in the vertical direction. This arrangement reduces lengths of the high-voltage cables 60, thereby making it possible to reduce the manufacturing cost.

In the present embodiment, the charging-inlet connector 68, which connects between the relay box 70 and the in-vehicle charging cables 66 connected to the DC inlet 64, and the battery connector 62 are arranged side by side on one of opposite sides of the relay box 70, namely, on the same side of the relay box 70. This arrangement makes it easier to protect the charging-inlet connector 68 from interference by a member or members located on a front side of the charging-inlet connector 68 in event of front collision of the vehicle 10.

While the preferred embodiment of this invention has been described in detail by reference to the drawings, it is to be understood that the invention may be otherwise embodied.

For example, in the above-described embodiment, the power source compartment housing the drive apparatus 14 (i.e., the case 18) may be also a rear compartment that is provided on a rear side as one of opposite sides of the driver's seat compartment 94 in the longitudinal direction of the vehicle 10. In this case, the rear wheels 16 serve as the drive wheels while the front wheels 12 serve as the driven wheels. Further, the electric-power control unit 50, the battery connector 62 and the relay box 70 are located in the rear compartment. Further, when being installed in the vehicle 10, the battery connector 62 is located on a front side as one of opposite sides of the relay box 70, which is close to the driver's seat compartment 94, in the longitudinal direction of the vehicle 10. This arrangement makes it easier to protect the battery connector 62 from interference by a member or members located on a rear side of the battery connector 62 in event of rear collision of the vehicle 10, so that it is possible to avoid or suppress damage of the battery connector 62 due to the collision. It is noted that the present invention is applicable also to an all-wheel drive vehicle in which the front wheels 12 and the rear wheels 16 are to be independently driven by drive apparatuses 14 that are housed in the front and rear compartments.

Further, in the above-described embodiment, the electric vehicle according to the present invention is constituted by the electric vehicle 10 by way of example. However, the present invention is applicable to any electric vehicle including an electric motor, a power transmission device, a driving battery and an electric-power control device wherein the battery is to be connected to an external charger so as to be charged.

It is to be understood that the embodiment described above is given for illustrative purpose only, and that the present invention may be embodied with various modifications and improvements which may occur to those skilled in the art.

NOMENCLATURE OF ELEMENTS

10: electric vehicle
10*a*: outer plate
12: front wheel (drive wheel)
14: drive apparatus
40: high-voltage battery (driving battery)
50: electric-power control unit (electric-power control device)
60: high-voltage cable (electrical wire connected to battery)
62: battery connector (connector, first connector)
64: DC inlet (charging inlet)
66: in-vehicle charging cable (electrical wire connected to charging inlet)
68: charging-inlet connector (second connector)
70: relay box
72: terminal block
72*t*1: first terminal
72*t*2: second terminal
72*t*3: third terminal
72*t*4: fourth terminal
72*t*5: fifth terminal
74*cw*1: first connector wire
74*cw*2: second connector wire
76*sp*1: first supply path
76*sp*2: second supply path
76*sp*3: third supply path
78*pw*1: first power wire
78*pw*2: second power wire
78*pw*3: third power wire
78*pw*4: fourth power wire
78*pw*5: fifth power wire
90: front compartment (power source compartment)
92: driver's seat
94: driver's seat compartment
100: charging station (external charger)
MG: electric motor
PS: power supply paths
PT: power transmission device

What is claimed is:

1. An electric vehicle comprising:
a drive wheel;
an electric motor serving as a power source;
a power transmission device configured to transmit a power of the electric motor to the drive wheel;
a driving battery that is to be connected to an external charger so as to be charged;
an electric-power control device configured to control an electric power transferred between the battery and the electric motor;
a connector connecting between the electric-power control device and an electrical wire that is connected to the battery;

a relay box configured to switch power supply paths to the battery in accordance with the electric power of the external charger; and a power source compartment which houses a drive apparatus including the electric motor and the power transmission device and which is provided on one of opposite sides of a driver's seat compartment in a longitudinal direction of the electric vehicle, wherein the electric-power control device, the connector and the relay box are disposed in the power source compartment, and wherein the connector is located adjacent to the relay box and is located between the relay box and the driver's seat compartment in the longitudinal direction.

2. The electric vehicle according to claim 1, wherein the electric-power control device and the relay box are located adjacent to the drive apparatus, and a terminal block is located between the electric-power control device and the relay box, wherein the power supply paths include a first supply path that is to be connected and disconnected in accordance with the electric power of the external charger, a second supply path that is connected irrespective of the electric power of the external charger, and a third supply path that is to be connected and disconnected in accordance with the electric power of the external charger, and wherein the terminal block includes:

a first terminal connecting between a first connector wire connected to the connector and a first power wire connected to the electric-power control device;

a second terminal connecting between a second connector wire connected to the connector and a second power wire connected to the electric-power control device;

a third terminal connecting between the first supply path and a third power wire that is connected to the electric-power control device and the first power wire;

a fourth terminal connecting between the second supply path and a fourth power wire that is connected to the electric-power control device and the second power wire; and a fifth terminal connecting between the third supply path and a fifth power wire that is connected to the first power wire through the electric motor and the electric-power control device.

3. The electric vehicle according to claim 1, wherein the power source compartment is provided on a front side as the one of the opposite sides of the driver's seat compartment in the longitudinal direction, and wherein the connector is located adjacent to a rear end of the relay box in the longitudinal direction.

4. The electric vehicle according to claim 1, wherein the battery is located on a lower side of the driver's seat compartment in a vertical direction of the electric vehicle.

5. The electric vehicle according to claim 1, further comprising:

a charging inlet which is provided in an outer plate that defines the power source compartment, and which is to be connected to the external charger; and a second connector in addition to the connector as a first connector, the second connector connecting between the relay box and an electrical wire that is connected to the charging inlet, wherein the first connector and the second connector are arranged side by side on one of opposite sides of the relay box.

* * * * *